Patented Mar. 1, 1949

2,463,396

UNITED STATES PATENT OFFICE 2,463,396

DISTILLATION OF TITANIUM TETRACHLORIDE

Ignace Joseph Krchma, Wilmington, Del., assignor to E. I. du Pont de Nemours & Company, Wilmington, Del., a corporation of Delaware No Drawing. Application June 26, 1946, Serial No. 679,560

6 Claims. (Cl. 202—46)

This invention relates to the manufacture of metal halides, especially titanium tetrachloride, and more particularly to the separation and recovery of titanium tetrachloride from mixtures thereof with other metal halides, such as iron chlorides.

Titanium tetrachloride is commonly prepared by chlorinating at relatively high temperatures and under reducing conditions titaniferous materials such as ferro-titanium, ilmenite, rutile or like ores. When, as is generally the case, these materials contain both titanium and iron, a gaseous mixture of titanium tetrachloride and iron chlorides results which must be separated into its components before a relatively pure form of titanium tetrachloride can be obtained. The iron chlorides generally comprise both ferrous and ferric compounds, since both are usually formed in the chlorination of such ores. By virtue of their different boiling points, it is possible to effect some degree of separation of the various components of these mixtures by fractional condensation, i. e., by first condensing out the iron chlorides and subsequently, at lower temperature, the titanium tetrachloride. However, the iron chlorides normally condense from the vapor state directly to the solid phase and it is difficult to conduct the condensation without an attendant sticking of such iron chlorides to the condenser walls. This induces objectionable plugging of the condenser. Hence, it is more convenient to condense the vapors to obtain a mixture of liquid TiCl4 and solid iron chlorides which is more amenable to separation.

When the mixture is relatively rich in TiCl4, filtering will effect partial separation. The filter cake then can be heated to remove the TiCl4 by vaporization, or may be purged by passing an inert gas through the cake while heating. However, this type of separation is also disadvantageous because heating of the cake is highly inefficient due to the fact that heat transfer through the solid mass is very low, while the use of an inert gas effects removal of the titanium tetrachloride in such dilute form that it is very difficult to recover by subsequent condensation.

It is among the objects of this invention to overcome the above and other disadvantages which characterize prior methods for separating metal halide mixtures and to provide in particular a novel and improved method for separating titanium tetrachloride from mixtures with iron chlorides. A further object is to provide a novel method for effecting a sharp, clean separation whereby the titanium tetrachloride will be recovered in relatively pure, undiluted state. A still further object is to effect such separation in a manner which will insure the leaving of the iron chloride in a relatively loose, free-flowing condition. Other objects and advantages of the invention will be evident from the ensuing description thereof.

The above objects are attainable in this invention which comprises separating a volatilizable, normally liquid metal halide, especially a titanium tetrahalide, from a mixture of said halide with a normally solid metal halide by subjecting such mixture to treatment with a vaporized, superheated form of said normally liquid halide, condensing the vaporized product, and recovering the relatively pure liquid halide desired.

In a more specific and preferred embodiment the invention comprises subjecting a mixture of liquid titanium tetrachloride and solid iron chlorides to contact with superheated titanium tetrachloride vapors until substantially all of the liquid titanium tetrachloride present in said mixture is vaporized and removed as vapor, and then separately condensing the resulting vaporized titanium tetrachloride to recover the desired liquid titanium tetrachloride.

In practically adapting the invention as applied to such preferred embodiment, and to obtain titanium tetrachloride useful in the production of pigment-quality TiO2, the mixture of solid iron chlorides and liquid titanium tetrachloride which is to be separated is placed in a suitable corrosion-resistant container vessel following which superheated titanium tetrachloride is introduced over or preferably into the mixture to heat the mass to the boiling point of titanium tetrachloride and vaporize and remove the titanium chloride constitutent. Such operation may be conducted as either a batch process (as in an insulated kettle, column or tank), or in a continuous manner, as by utilizing suitable equipment for the purpose, such as a rotary kiln-type evaporator, etc. For large scale types of operation, a rotary evaporator is preferable, the superheated titanium tetrachloride vapor and the chloride mixture being caused to flow concurrently, with separated titanium tetrachloride vapor and solid ferric chloride being continuously withdrawn from the discharge end of the evaporator.

The titanium tetrachloride vapor employed herein to effect vaporization and removal of the liquid TiCl4 must be superheated to a temperature of at least 150° C., and preferably ranges from temperatures between 180° C. and 300° C., so that it possesses sufficient heat capacity to volatilize all of the liquid titanium chloride present in the mixture being treated without recourse to the use of excessive quantities of vapor and while avoiding substantial vaporization of ferric chloride present. Preferably, also, the amount of superheated vapor used, in relation to the amount and composition of the mixture, should be so regulated that the product gas and solid iron chlorides will be caused to emerge from the evaporator for separate condensation at a temperature ranging from 140° C. to 180° C., and preferably between 140° C. and 160° C. So long as the exit temperature is so regulated, no significant overall vaporization of ferric chloride will take place even if the temperature of the superheated vapor is higher than the limits stated above, but it is generally desirable to observe these limits in order to prevent intermediary volatilization and condensation of ferric chloride.

The titanium tetrachloride recovered is in a high state of purity, being substantially free from objectionable metal or other impurities. The iron chloride produced is in a dry, pulverulent, free-flowing condition, and when removed from the evaporator at a temperature of about 150° C. and cooled without any aeration or other treatment, usually contains between 0.1 and 0.2% of titanium tetrachloride. This amount is normally not objectionable since it is not great enough to make the ferric chloride wet or sticky, which would render it difficult to effect removal of the latter from the treating vessel. However, if for any reason it is desirable to reduce the titanium content to a still lower level, this may be done by contacting the ferric chloride with a heated inert gas such as nitrogen. As the amount of titanium tetrachloride so removed represents a very small portion of the total original content, no provisions for its recovery are generally necessary or desirable.

To a more complete understanding of the invention, the following specific example is given, which is merely in illustration and not in limitation of the invention:

Example

A mixture containing approximately 33 pounds of ferric chloride and 22 pounds of titanium tetrachloride was charged, while at room temperature, into a vertical, insulated, cylindrical, corrosion-resistant, lined steel column, provided with a vapor outlet at its upper end and a removable, sintered glass plate at its bottom, connected to a gas inlet pipe. The column was six inches in inside diameter and was four feet tall.

Crude titanium tetrachloride was vaporized in a separate still pot and the vapors were conducted through a silica coil enclosed in a gas-fired furnace to effect superheating thereof to a temperature of 225° C. The superheated vapors were then introduced into the above column through its sintered plate and at a rate of 10.3 cubic feet per minute. The contents of the column were mechanically agitated during the reaction, in order to effect intimate contact between them and the superheated titanium tetrachloride. For the first eight minutes of introduction, only a trace of titanium tetrachloride emerged from the top of the column, since during this period essentially all of the vapors were condensed inside the column, thus heating up the chloride mixture. After eight minutes, however, titanium tetrachloride vapor issued from the column at a temperature of about 136° C., and continued to discharge therefrom at that temperature and at steady rate for 66 more minutes. At the end of this time, the temperature of the issuing vapor gradually increased until after the lapse of five more minutes a vapor temperature of 160° C. was reached. At this point the flow of superheated TiCl4 vapor to the column was discontinued.

During the evaporation period the effluent titanium tetrachloride vapors were fed continuously to a conventional water-cooled surface type of steel condenser and recovered. The resulting condensate was in a high state of purity, containing only a negligible trace of iron.

When the bottom plate of the evaporation column was removed, the residual ferric chloride was found to be relatively dry and pulverulent and fell out of the vessel without any tendency to stick or adhere thereto. On analysis it was found to contain only 0.1% by weight of titanium tetrachloride.

While described as applied to certain preferred adaptations involving the separation of titanium chloride from mixtures with ferric chloride, the invention is not, as already indicated, limited thereto. Obviously, suitable variance may be made therefrom without departing from the underlying spirit and scope. Thus, it is equally operable in separating either ferric or ferrous chlorides (or both) from titanium chloride. Furthermore, in lieu of the methods mentioned for effecting contact of the superheated vapor with the metal halide mixture, the latter may be allowed to fall through an upwardly-flowing stream of the superheated vapor, or contact may be effected by passing said vapor over said mixture as it is carried on a conveyor belt, or the like, or through feeding the mixture into a stream of the superheated vapor and accomplishing the desired separation by means of a settling chamber, cyclone separator, or by any other convenient and desired contacting and separatory means.

The titanium tetrachloride or other treating agent used herein may be superheated by any suitable means, conventional preheating equipment being satisfactory for the purpose, provided care is taken that those parts of the apparatus which come in contact with the chloride are of sufficient corrosion-resistant character. Nickel and nickel alloys, as well as ceramics, graphite and resin-impregnated graphite, silica and glass, comprise suitable types of materials of construction for this purpose. The evaporator may also be a nickel alloy or consist of glass-lined metal. To insure an economical operation it is preferably thoroughly insulated.

The stream of titanium tetrachloride vapor issuing from the evaporator at about 150° C., and originating partly from the original superheated vapor and partly from the liquid present in the chloride mixture, generally will be divided at the evaporator exit. One portion will be recirculated to the preheater and thence to the evaporator, while the other portion will flow directly to a condenser. The proportion which is recirculated will depend on the amount and composition of the chloride mixture to be separated, and will be such as to give proper regulation of the temperature of the substances emerging from the evaporator, as described above. That portion of the emerging titanium tetrachloride which is not recirculated is conducted to a condenser, which may be of conventional type or may consist of a fractionating column for purification, or the vapors may be purified while still in the gas phase, as by the process disclosed in co-pending application Serial No. 661,914 of Holger H. Schaumann.

When the chloride mixture consists mainly of titanium tetrachloride, it is generally more economical to remove a portion of this by filtration or by settling and decantation prior to the evaporation step, although this is not necessary as my novel process is equally effective in obtaining the desired separation when mixtures high in titanium tetrachloride are subjected to treatment.

Previously, separation of iron and titanium chloride mixtures by means of simple heating has proved very difficult and inefficient due to poor heat transfer characteristics thereof. In an effort to overcome this, the use of an inert purging gas adapted to carry off vaporized titanium tetrachloride and afford a more efficient heating of the mass has been suggested. This, however, is disadvantageous because the recovered titanium tetrachloride is in a undesirably diluted form and complete recovery thereof by subsequent condensation and at extremely low temperatures, or by resort to special techniques, is required. This arises from the fact that the vapor pressure of titanium tetrachloride at room temperature is quite appreciable and a substantial proportion thereof will not be condensed from dilute gas mixtures at ordinary temperatures. Thus, with ten per cent titanium tetrachloride in the gas mixture, less than 80% is condensed at 30° C. The present process, on the other hand, obviates these disadvantages since the titanium tetrachloride is removed in undiluted form and is recovered completely by condensation while heating of the chloride mixture is efficiently accomplished.

While particularly useful in the separation of mixtures of titanium and iron chlorides, the invention is generally adaptable for separating a halide which normally condenses directly to the solid phase from its vaporous mixtures with other halides. Thus, it is applicable to the separation of ZrCl₄ and CrCl₃, etc., from more volatile, normally-liquid halides, including those of SiCl₄ (B. P. 58° C.), SnCl₄ (B. P. 114° C.), VOCl₃ (B. P. 127° C.), TiBr₄ (B. P. 230° C.), TiCl₄, etc. Similarly, any other type of vaporized, superheated form of separating agent which is normally liquid at atmospheric temperature and pressure, is non-reactive toward the halide mixture under treatment, and is easily separable by fractionation from the vaporous products recovered, can be used in the invention. In addition to the above, superheated forms of various chlorinated hydrocarbons, such as carbon tetrachloride, trichlorethylene, trichlorethane, butyl-chloride, dichloroethane, etc., can be used. When vapors of these halides or liquids are employed to effect removal of a liquid metal halide from its mixture with a less volatile, solid metal halide, such vapors must be preheated prior to use to a temperature at least 15° C. above their boiling point under the conditions of pressure used in the particular system, or above the temperature at which the titanium tetrachloride or other normally-liquid material being separated is vaporous. Preferably, I resort to superheating temperatures ranging from about 40° C. to 200° C. above said boiling or vaporous point.

I claim as my invention:

1. A method for separating and recovering liquid titanium tetrachloride in substantially pure, undiluted form from its mixture with iron chlorides, comprising treating said mixture with sufficient vaporized, superheated titanium tetrachloride to effect substantially complete vaporization of the titanium tetrachloride present in said mixture, and then condensing the vaporous product which results from said treatment.

2. A method for separating and recovering liquid titanium tetrachloride in substantially pure, undiluted form from a mixture of said chloride with ferric chloride, comprising treating said mixture with a sufficient amount of vaporized, superheated titanium tetrachloride to effect substantially complete vaporization of the titanium tetrachloride present in said mixture, and then condensing the vaporous product resulting from said treatment.

3. A method for separating and recovering liquid titanium tetrachloride in substantially pure, undiluted form from a mixture of said chloride with ferrous chloride, comprising treating said mixture with a sufficient amount of a vaporized, superheated titanium tetrachloride to effect substantially complete vaporization of the titanium tetrachloride present therein, and then condensing the vaporous product resulting from said treatment.

4. A method for separating and recovering liquid titanium tetrachloride in substantially pure, undiluted form from a mixture of said chloride with ferric chloride, comprising treating said mixture with sufficient titanium tetrachloride superheated to a temperature of at least 150° C. to effect substantially complete vaporization of the titanium tetrachloride present therein, and then condensing the vaporous product resulting from said treatment.

5. A method for separating and recovering liquid titanium tetrachloride in substantially pure, undiluted form from a mixture of said chloride with ferric chloride, comprising treating said mixture with sufficient titanium tetrachloride, superheated to a temperature ranging from 150° C. to 300° C., to effect substantially complete vaporization of its titanium tetrachloride component, and then condensing the vaporous product resulting from said treatment.

6. A method for separating and recovering liquid titanium tetrachloride in substantially pure, undiluted form from a mixture of said chloride with ferrous chloride, comprising treating said mixture with sufficient titanium tetrachloride, superheated to a temperature ranging from 150° C. to 300° C., to effect substantially complete vaporization of its titanium tetrachloride component, and then condensing the vaporous product resulting from said treatment.

IGNACE JOSEPH KRCHMA.

REFERENCES CITED

The following references are of record in the file of this patent:

UNITED STATES PATENTS

| Number | Name | Date |
|---|---|---|
| 168,802 | Stevens | Oct. 11, 1875 |
| 918,335 | Lain | Apr. 13, 1909 |
| 1,179,394 | Barton | Apr. 18, 1916 |
| 1,409,338 | Fenton | Mar. 14, 1922 |
| 1,662,671 | Rather et al. | Mar. 29, 1927 |
| 2,397,350 | Hayden | Mar. 26, 1946 |